ROBERTSON & CARR
Wheel Cultivator.
No. 30,589.
Patented Nov. 6, 1860.
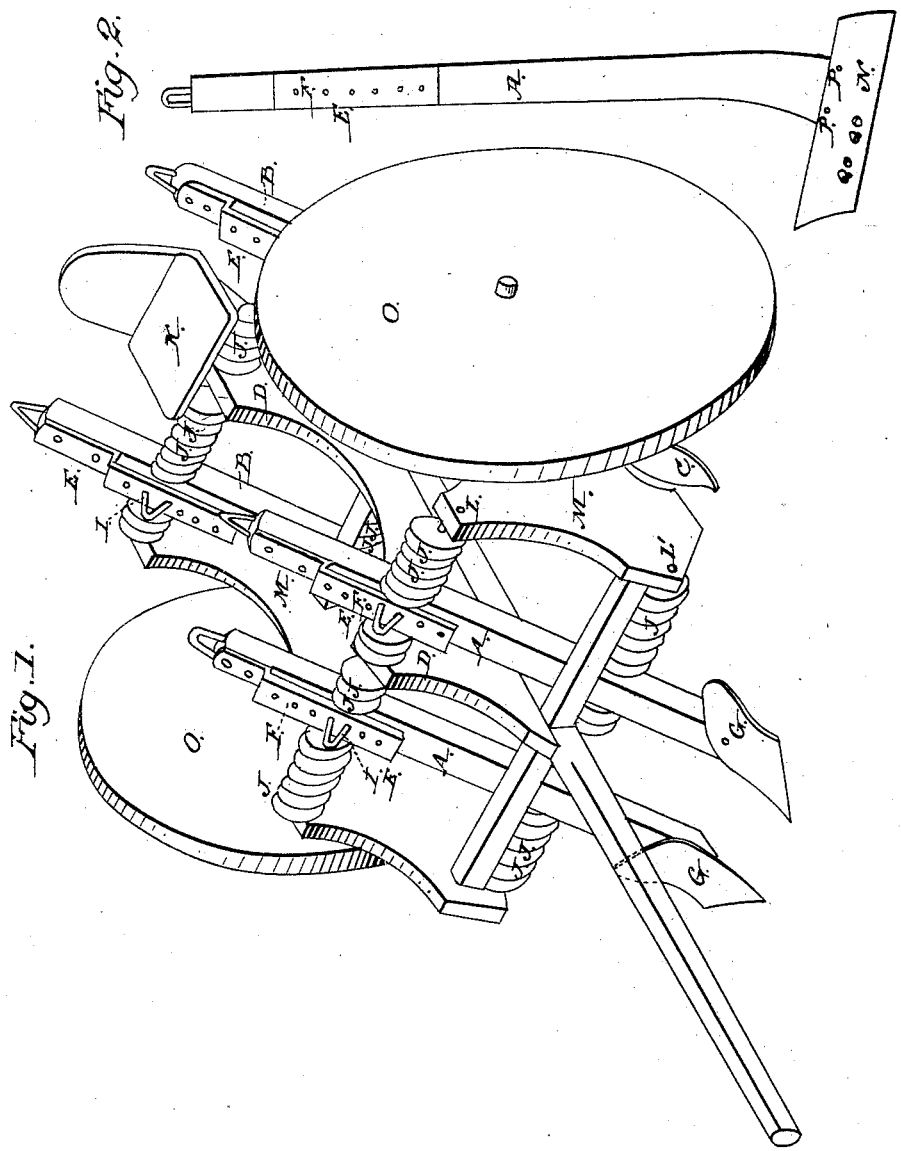

UNITED STATES PATENT OFFICE.

H. H. ROBERTSON AND C. G. CARR, OF KINGSTON, MISSOURI.

IMPROVEMENT IN CULTIVATORS.

Specification forming part of Letters Patent No. 30,589, dated November 6, 1860.

*To all whom it may concern:*

Be it known that we, H. H. ROBERTSON and CYRUS G. CARR, of Kingston, in the county of Caldwell and State of Missouri, have invented a new and useful Improvement in Cultivators; and we do hereby declare that the following is a full, clear, and exact description of the same, reference being had to the accompanying drawings, forming a part of this specification, in which—

Figure 1 represents a perspective view of the machine, and Fig. 2 a view of a detached portion of the machine.

Similar letters of reference in each of the figures indicate corresponding parts.

To enable others skilled in the art to make and use our invention, we will proceed to describe its construction and operation.

The machine represented in the accompanying drawings and designed to exemplify the application of my invention is a cultivator with two shares, G G, in front and two, C C, behind. More shares might be employed in such a manner that all the shares G would form one line and the shares C another line across the path of the machine.

The frame of the machine consists of three partitions, M D M, supported upon two driving-wheels, O O. K is the driver's seat. Two sets of bars, L L', are arranged across the three partitions, the bar L' of each set being hollow and somewhat forward of the bar L. A series of buttons, J, are slipped over the bars L L', the bars passing through suitable holes in the center of the buttons. The number of buttons between each two of the partitions M M D is such that they leave an open space of the width of one of the shanks A B. The shanks are placed into said open spaces and secured in place in the foregoing manner. The lower part of each shank is placed, in the accompanying open space between the buttons of bar L, against the back of bar L. The shank is then moved down until a loop, E, fastened to the top part of the shank and open at the lower end, slips over bar L. The loop and shank are provided with a series of equidistant holes, F. By inserting a forked pin, I, into any two succeeding holes F, so as to embrace the bar L, the shank is secured. It will be seen that by means of this forked pin and the perforated loop, the shank, and together with it the plowing implement attached to the lower end of the shank, can be placed higher or lower, as may be desired.

It will also be seen that by withdrawing the forked pin and raising the shank so as to lift the loop above the bar L the shank can be freed from the bar and buttons. By moving the lower part of the shank a little forward it can be also freed from the buttons and bar L'. The buttons can then be shifted so as to adjust the open spaces between the buttons—intended to receive the shank—nearer to or farther from the center partition, D. The shanks are then again secured in place, as above described, and thus the distance between each two of the series of shanks G or of the series of shanks C can be regulated at will.

It will be understood that various plowing or cultivating implements may be attached to the shanks G C. Fig. 2 represents a cotton-scraper, two of which may be attached in place of the shares G C. This cotton-scraper N is sharp at its upper as well as lower edge, and is provided with two pairs of holes, P P and Q Q, so that it may be reversed whenever one edge is worn out.

What we claim is—

The arrangement for united operation in a a cultivator of two or more plows, G, or scrapers, N, a series of cross-bars, L L', a series of adjustable buttons, J, perforated loops E, and stop-pins I, substantially in the manner and for the purposes described.

HENRY H. ROBERTSON.
CYRUS G. CARR.

Witnesses:
LEMUEL DUNN,
H. B. NELSON.